US010195936B2

(12) United States Patent
Fukuyasu et al.

(10) Patent No.: US 10,195,936 B2
(45) Date of Patent: Feb. 5, 2019

(54) FILLER TUBE AND MANUFACTURING PROCESS FOR THE SAME

(71) Applicant: Sumitomo Riko Company Limited, Komaki-shi, Aichi (JP)

(72) Inventors: Tomoyuki Fukuyasu, Komaki (JP); Makoto Shimojo, Komaki (JP); Atsuo Miyajima, Komaki (JP); Kazuki Hatanaka, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 3 days.

(21) Appl. No.: 15/584,994

(22) Filed: May 2, 2017

(65) Prior Publication Data

US 2017/0232838 A1   Aug. 17, 2017

Related U.S. Application Data

(63) Continuation of application No. PCT/JP2016/075783, filed on Sep. 2, 2016.

(30) Foreign Application Priority Data

Sep. 29, 2015  (JP) ................................. 2015-191495
Feb. 24, 2016  (JP) ................................. 2016-032624

(51) Int. Cl.
*B60K 15/04*   (2006.01)
*B29C 43/22*   (2006.01)
(Continued)

(52) U.S. Cl.
CPC ........ *B60K 15/0406* (2013.01); *B29C 43/226* (2013.01); *B29C 57/04* (2013.01);
(Continued)

(58) Field of Classification Search
CPC .......... B60K 15/0406; B60K 2015/047; B29C 43/226; B29C 65/02; B29C 65/7481; B29K 2023/065
(Continued)

(56) References Cited

U.S. PATENT DOCUMENTS 7,169,453 B2      1/2007  Le Roy et al.
2005/0089701 A1*  4/2005  Le Roy .................. B32B 27/30
                                                      428/516
(Continued)

FOREIGN PATENT DOCUMENTS

JP      2003-194280 A    7/2003
JP         3575754 B2   10/2004
(Continued)

OTHER PUBLICATIONS

Nov. 8, 2016 Written Opinion issued in International Patent Application No. PCT/JP2016/075783.
(Continued)

*Primary Examiner* — Steven A. Reynolds
*Assistant Examiner* — Javier A Pagan
(74) *Attorney, Agent, or Firm* — Oliff PLC (57) ABSTRACT

A filler tube, which is capable of satisfying required functions suitably in compliance with the bellows and non-bellows cylindrical base while securing weld strength and fuel-permeation resistance property in the weld face, is provided. A filler tube includes a non-bellows cylindrical base with a total thickness of from 2 to 4 mm, a bellows with a total thickness of from 0.5 to 3 mm, and a flange having a total thickness of from 3.5 to 5 mm, and including an end face to be welded to a fuel tank. The non-bellows cylindrical base, the bellows, and the flange include inner layers formed so as to have a thickness accounting for from 40 to 60% of the total thicknesses, and formed of high-density polyeth-
(Continued)

ylene (or HDPE) serving as the major constituent, intermediate layers exhibiting fuel-permeation resistance property, and outer layers protecting the intermediate layers.

10 Claims, 6 Drawing Sheets

(51) Int. Cl.
    *B29C 65/02*     (2006.01)
    *B29C 65/78*     (2006.01)
    *B29C 57/04*     (2006.01)
    *B32B 1/08*     (2006.01)
    B29K 23/00     (2006.01)
    B29K 77/00     (2006.01)
    B29L 23/18     (2006.01)
    B29C 49/00     (2006.01)

(52) U.S. Cl.
    CPC .......... *B29C 65/02* (2013.01); *B29C 65/7841* (2013.01); *B32B 1/08* (2013.01); *B60K 15/04* (2013.01); *B29C 49/0015* (2013.01); *B29K 2023/065* (2013.01); *B29K 2023/086* (2013.01); *B29K 2077/00* (2013.01); *B29L 2023/183* (2013.01); *B60K 2015/047* (2013.01)

(58) Field of Classification Search
    USPC ........................................ 206/86.2; 220/86.2
    See application file for complete search history.

(56) References Cited

U.S. PATENT DOCUMENTS

| | | | |
|---|---|---|---|
| 2015/0068634 A1* | 3/2015 | Katayama | ............. F16L 11/121 |
| | | | 138/118 |
| 2016/0109042 A1* | 4/2016 | Hirohara | ................ B60K 15/04 |
| | | | 285/194 |

FOREIGN PATENT DOCUMENTS

| | | | |
|---|---|---|---|
| JP | 3775656 | B2 | 5/2006 |
| JP | 2009-255891 | A | 11/2009 |
| JP | 2009255891 | * | 11/2009 |
| JP | 2010-116094 | A | 5/2010 |
| JP | 2010116094 | * | 5/2010 |
| JP | 5243904 | B2 | 7/2013 |
| JP | 2014-231286 | A | 12/2014 |
| JP | 2015-55261 | A | 3/2015 |

OTHER PUBLICATIONS

Nov. 8, 2016 International Search Report issued in International Patent Application No. PCT/JP2016/075783.
Sep. 30, 2018 Office Action issued in Chinese Patent Application No. 201680004022.2.

* cited by examiner

Fig. 11 though a thickness of the HDPE layer forming a welding layer, because the welding face is formed as a flanged shape in order to secure an area therefor.

FILLER TUBE AND MANUFACTURING PROCESS FOR THE SAME

CROSS REFERENCE TO RELATED APPLICATIONS

The present application is a Continuation Application of International Application No. PCT/JP2016/075783, filed on Sep. 2, 2016, which is incorporated herein by reference. The present invention is based on Japanese Patent Application No. 2015-191495, filed on Sep. 29, 2015, and Japanese Patent Application No. 2016-032624, filed on Feb. 24, 2016, claiming the domestic priority of the former, the entire contents of which are incorporated herein by reference.

BACKGROUND OF THE INVENTION

1. Field of the Invention

The present invention relates to a filler tube, and a manufacturing process for the same.

2. Description of the Related Art

Japanese Unexamined Patent Publication (KOKAI) Gazette No. 2014-231286 sets forth to weld the end face of a thermoplastic-resin filler tube to the opening of a fuel tank made of resin. The filler tube comprises a flange at the end to be welded to the fuel tank. Moreover, Japanese Unexamined Patent Publication (KOKAI) Gazette No. 2003-194280 also sets forth to weld the end face of a filler tube to the opening of a fuel tank. A welding site in the filler tube is formed in a heavy thickness, compared with the other sites. Moreover, it is deemed possible to make the filler tube have a heavy thickness by corrugation molding.

Japanese Patent Gazette No. 5243904 sets forth to use high-density polyethylene resin (or HDPE) in order to enhance weldability in a joining part to be welded to a fuel tank made of resin. In addition, it sets forth not to use conventional ethylene-vinyl alcohol (or EVOH) copolymers for the joining part, but to use a special material including HDPE, in order to acquire fuel-permeation resistance property therefor. Thus, it is deemed possible to make the joining part satisfactory in the fuel-permeation resistance property and weldability.

Moreover, Japanese Patent Gazette No. 3575754 sets forth a structure applied to tubes and tanks, or the like, and comprising a first layer made of HDPE, a second layer made of EVOH as the major constituent, and a third layer made of polyamide or a mixture of polyamide and polyolefin.

In addition, Japanese Unexamined Patent Publication (KOKAI) Gazette No. 2015-55261 sets forth a manufacturing process for filler tube made of resin. According to the manufacturing process, corrugation molding is carried out to mold a tube comprising a bellows, and a non-bellows cylindrical base. In the corrugation molding, a cylindrical raw workpiece, which has been extruded by an extruder, is pressed by a corrugated mold against a cavity in the mold. Moreover, the non-bellows cylindrical base is subjected to bending forming by press processing.

SUMMARY OF THE INVENTION

In such an instance as welding the end face of a filler tube onto a fuel tank, weld strength makes an important element. The weld strength differs depending on an area of the planar section in a welding face of the filler tube, a material in the welding face, and a thickness of the material. As for the material in the welding face, it has been known that HDPE is suitable as set forth in Japanese Patent Gazette No. 5243904.

Moreover, as set forth in Japanese Patent Gazette No. 5243904 and Japanese Patent Gazette No. 3575754, filler tubes need to exhibit fuel-permeation resistance property. Hence, using the special material set forth in Japanese Patent Gazette No. 5243904 brings about making filler tubes highly costly. On the other hand, using nonspecial HDPE for the welding face leads to making it necessary to dispose a layer undertaking fuel-permeation resistance the property, such as the EVOH layer set forth in Japanese Patent Gazette No. 3575754, for instance. However, the welding face makes a factor of decreasing fuel-permeation resistance property by the extent of a thickness of the HDPE layer forming a welding layer, because the welding face is formed as a flanged shape in order to secure an area therefor.

In addition, as set forth in Japanese Unexamined Patent Publication (KOKAI) Gazette No. 2015-55261, for instance, a filler tube further comprises, in addition to the welding face, a bellows, and a non-bellows cylindrical base. Besides the welding performance of the welding face, functions are required for each of the bellows and base as well. For example, the bellows is needed in order to make handling or laying out the filler tube easier. The non-bellows cylindrical base needs to exhibit shock resistance, for instance.

The present invention is aimed at providing a filler tube that is capable of satisfying required functions suitably in compliance with the bellows and non-bellows cylindrical base while securing weld strength and fuel-permeation resistance property in the weld face, and a manufacturing process for the same.

(1) Filler Tube

A filler tube directed to the present invention is a filler tube to be welded to a fuel tank at an opening thereof, and made of thermoplastic resin. Prior to being welded, the filler tube comprises:

a non-bellows cylindrical base with a total thickness of from 2 to 4 mm;

a bellows with a total thickness of from 0.5 to 3 mm; and a flange having a total thickness of from 3.5 to 5 mm, and including an end face to be welded to the fuel tank.

The base, the bellows, and the flange include:

an inner layer formed so as to have a thickness accounting for from 40 to 60% of the total thicknesses, and formed of high-density polyethylene (or HDPE) serving as a major constituent thereof;

an intermediate layer arranged on an outer peripheral side of the inner layer, and exhibiting fuel-permeation resistance property; and an outer layer arranged on an outer peripheral side of the intermediate layer, and protecting the intermediate layer.

HDPE is satisfactory in welding performance to fuel tanks made of resins. Moreover, the flange has a total thickness of from 3.5 to 5 mm, and includes the inner layer having a thickness of 40% or more of the total thickness. In addition, the inner layer is formed of HDPE serving as the major constituent. The inner layer of the flange makes a site that is located in the end face, and which contacts with a fuel tank. That is, the inner layer of the flange has a thickness to such an extent that enables it to secure necessary weld strength.

Moreover, in the flange, the inner layer, which exists between a surface of the fuel tank and the intermediate layer of the flange, exhibits low fuel-permeation resistance property, compared with the intermediate layer. However, the inner layer of the flange has a thickness of 60% or less of the total thickness of the flange. Therefore, in such a state as the inner layer of the flange is welded to the fuel tank, the thickness of the inner layer of the flange is small sufficiently. Consequently, it is possible to secure fuel-permeation resistance property fully at a site in the inner layer of the flange.

In addition, the base is formed to have a total thickness set to fall in a range of from 2 to 4 mm. Therefore, the base exhibits required shock resistance securely. On the other hand, the bellows is formed to have a total thickness set to fall in a range of from 0.5 to 3 mm. That is, the bellows is thinner than the base is. Consequently, it becomes feasible to make handling or laying out the filler tube easier, because the bellows exhibits satisfactory bendability. However, the bellows exhibits low shock-resistance performance, because its total thickness is thinner than that of the base. However, arranging the bellows suffices at a location in which shock resistance is not needed so much, but in which the bent arrangement is required.

(2) Manufacturing Process for Filler Tube

In addition to the aforementioned constituent elements, the filler tube, which is to be subjected to a manufacturing process, further comprises a non-bellows-shaped heavy-thickness cylinder with a total thickness of from 4 to 6 mm, wherein the flange protrudes outward radially from an end of the heavy-thickness cylinder in one of sides thereof facing the fuel tank.

The manufacturing process is a manufacturing process for the above-mentioned filler tube, and comprises:

a primary molding step of using a corrugated mold to mold a primary molded body by corrugation molding; and a secondary molding step of using an outer peripheral mold and an inner peripheral mold to mold the filler tube by performing press processing to the primary molded body.

The primary molded body includes the primary molded body including the base, the bellows, a cylindrical to-be-molded portion serving as a site for the flange before being flare molded, and the heavy-thickness cylinder.

The secondary molding step includes:

a primary-molded-body arrangement step of arranging the primary molded body onto the outer peripheral mold so as to make the outer peripheral mold, which is set at a predetermined temperature, support an outer peripheral face in the heavy-thickness cylinder of the primary molded body; and a flare-molding step of flare molding the flange by inserting the inner peripheral mold, which is set at a higher temperature than the predetermined temperature of the outer peripheral mold, into an inner peripheral side of the to-be-molded portion after the primary-molded-body arrangement step, and then relatively moving the outer peripheral mold and the inner peripheral mold in an axial direction thereof to make an end face of the outer peripheral mold and the inner peripheral mold clamp the to-be-molded portion therebetween in the axial direction.

In accordance with the aforementioned manufacturing process, the flange is formed by flare molding the cylindrical to-be-molded portion in the primary molded body. On this occasion, the outer peripheral mold supporting the filler tube on the outer peripheral side, and the inner peripheral mold supporting it on the inner peripheral side are used. Note herein that the inner peripheral mold is set at a higher temperature than the outer peripheral mold is. That is, the inner peripheral mold warms the to-be-molded portion in the primary molded body to turn it into a state of being likely to be flare molded.

On the other hand, the outer peripheral mold has a low temperature, compared with that of the inner peripheral mold, at the flare-molding step. The outer peripheral mold is a mold on which the primary molded body is arranged prior to the flare-molding step. That is, even when the inner peripheral mold is set at a high temperature relatively at the flare-molding step, sites in the primary molded body, which are in contact with the outer peripheral mold, do not turn into a state of being likely to deform so that displacements are less likely to occur in relative positions between the outer peripheral mold and the primary molded body, because the outer peripheral mold has a low temperature. Therefore, the flange is flare molded at a desired location.

Moreover, the flange is disposed consecutively from an end of the heavy-thickness cylinder in one of the sides facing a fuel tank. In addition, the heavy-thickness cylinder has a total thickness of from 4 to 6 mm that is thicker than that of the base. Consequently, the flange and the heavy-thickness cylinder can maintain such a state as exhibiting sufficient strength at the boundary site between them.

DESCRIPTION OF THE EMBODIMENTS (1) Construction of Fuel Line 1

Figure 1:
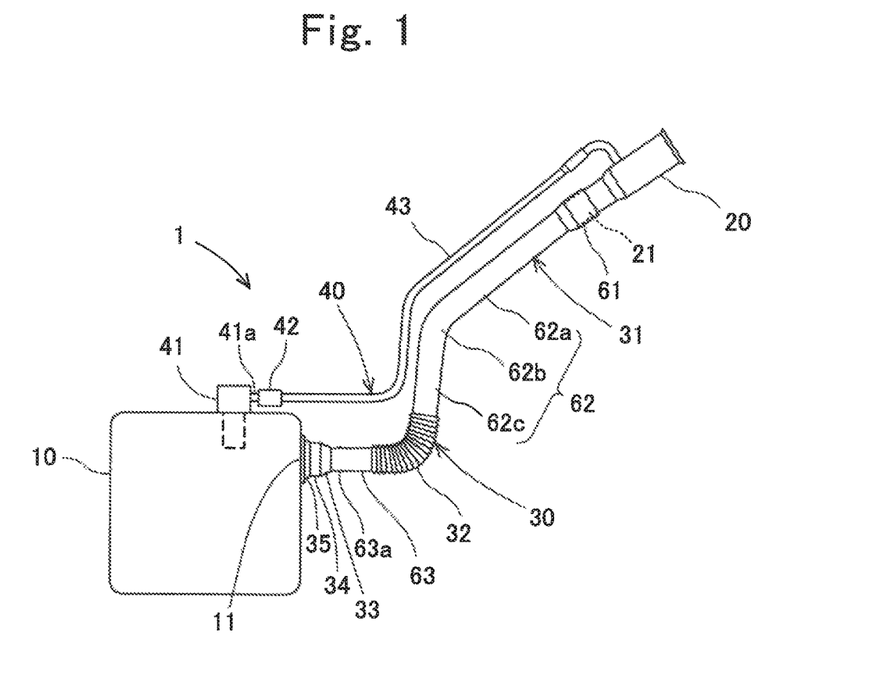
FIG. 1 is a diagram of a fuel line.

Explanations will be hereinafter made on the constructions of a fuel line 1 with reference to FIG. 1. A term, the "fuel line 1," is referred to a line from a filler neck up to an internal combustion engine (not shown) in an automobile. However, explanations will be made on from a filler neck 20 up to a fuel tank 10 alone in the present embodiment.

The fuel line 1 comprises the fuel tank 10, the filler neck 20, a filler tube 30, and a breather line 40. The fuel tank 10 is molded by thermoplastic resin, and reserves a liquid fuel, such as gasoline, therein. The liquid fuel reserved in the fuel tank 10 is supplied to the not-shown internal combustion engine, and is then used to drive the internal combustion engine. The filler neck 20 is disposed in the vicinity of an automotive outer surface into which a filler nozzle (not shown) is insertable. Onto the filler neck 20, a not-shown filler cap is mounted. In a side face of the fuel tank 10, an opening 11 for supplying fuel is formed.

The filler tube 30 is molded by thermoplastic resin, and connects between the filler neck 20 and the fuel tank 10. The filler tube 30 is welded to the opening 11 of the fuel tank 10 at one of the ends. Into the other end of the filler tube 30, an insertion portion 21 of the filler neck 20 is press fitted. The filler nozzle is inserted into the filler neck 20, and then the liquid fuel is supplied from the filler nozzle. Accordingly, the liquid fuel passes through the filler tube 30, and is then reserved in the fuel tank 10. Note herein that, when the liquid fuel fills up the fuel tank 10, the liquid fuel comes to be reserved in the filler tube 30, and then the liquid fuel touches the filler nozzle at the leading end. Consequently, the supply of the liquid fuel by the filler nozzle is stopped automatically. Moreover, the filler tube 30 is molded integrally over the entire length.

The breather line 40 connects the fuel tank 10 with the filler neck 20. The breather line 40 is a line for exhausting fuel vapors within the fuel tank 10 to the outside of the fuel tank 10 upon supplying the liquid fuel to the fuel tank 10 by way of the filler tube 30.

The breather line 40 comprises a cut-off valve apparatus 41, a connector 42, and a breather tube 43. The cut-off valve apparatus 41 is arranged on the upside of the fuel tank 10; when it is put in an opened state, the fuel vapors within the fuel tank 10 are exhausted toward a side of the filler neck 20. The cut-off valve apparatus 41 includes a connection pipe 41a made of metal. The connector 42 is coupled to the connection pipe 41a. The connector 42 is made up of such constituent elements as those of a connector (set forth in Japanese Patent Gazette No. 3775656, and so forth, for instance) from which the flow control valve is removed. That is, the connector 42 is disposed detachably to and from the connection pipe 41a. The breather tube 43 connects the connector 42 with the filler neck 20.

(2) Constructions of Filler Tube 30

Figure 2:
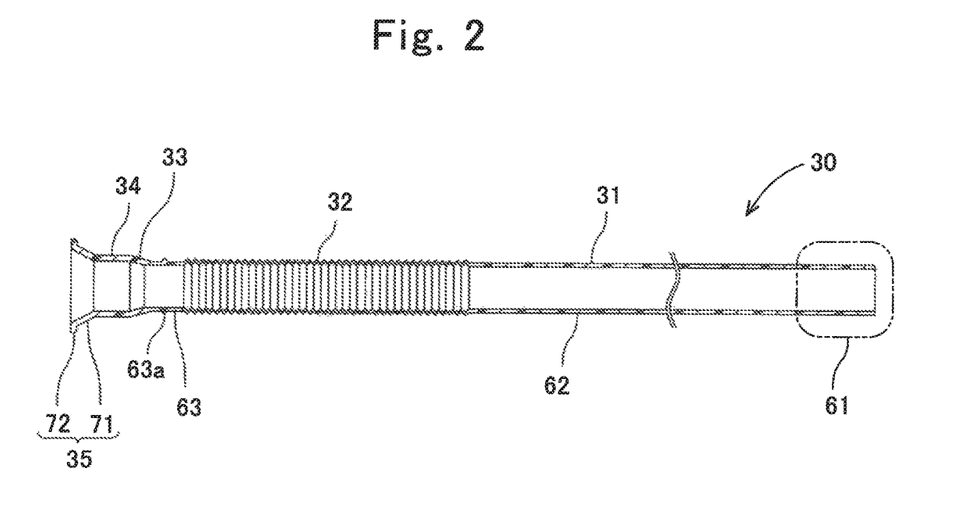
FIG. 2 is an axial cross-sectional diagram of a filler tube shown in FIG. 1, and is a drawing of the filler tube put in a linear state.

Explanations will be hereinafter made on constructions of the filler tube 30 with reference to FIG. 1 to FIG. 6. As illustrated in FIG. 1 and FIG. 2, the filler tube 30 comprises a non-bellows cylindrical base 31, a bellows 32, a tapered locker 33, a non-bellows-shaped heavy-thickness cylinder 34, and a flange 35. The total thicknesses ("T1," "T2,", "T4" and "T5") of the base 31, bellows 32, tapered locker 33, heavy-thickness cylinder 34 and flange 35 are set us as shown in FIG. 3 to FIG. 6. The total thicknesses become thinner in the order of the heavy-thickness cylinder 34, the flange 35, the base 31, and the bellows 32. Moreover, the filler tube 30 has a multi-layered structure by different species of thermoplastic resins, as shown in FIG. 3 to FIG. 6.

The base 31 is formed as anon-bellows cylindrical shape. Specifically, the base 31 is formed as a circularly cylindrical shape, or an elliptically cylindrical shape. The base 31 includes a press-fit base portion 61, a non-press-fit base portion 62, and a tank-side base portion 63.

The press-fit base portion 61 is disposed at an end of the filler tube 30 in one of the sides facing the filler neck 20 (i.e., at an end in one of the sides opposite to (or across from) the fuel tank 10). The press-fit base portion 61 is formed as a circularly cylindrical shape. The press-fit base portion 61 makes a site into which the insertion portion 21 of the filler neck 20 is press fitted into the inside. That is, the press-fit base portion 61 is expanded radially, compared with such a state as before the insertion portion 21 of the filler neck 20 is press fitted.

The non-press-fit base portion 62 is disposed consecutively at a tank-side end of the press-fit base portion 61. The press-fit base portion 61, which has been expanded to open by the press fitting around the insertion portion 21, makes the non-press-fit base portion 62 distinguishable from the press-fit base portion 61. However, in such a state as the press-fit base portion 61 is before being expanded to open by the press fitting around the insertion portion 21, the press-fit base portion 61 and non-press-fit base portion 62 are not distinguishable from one another so that the boundary between the two does not necessarily exist, because the press-fit base portion 61 has an identical diameter with that of the non-press-fit base portion 62.

The non-press-fit base portion 62 is provided with a first linear section 62a, a bent section 62b and a second linear section 62c in this order from one of the sides facing the press-fit base portion 61. The first linear section 62a is disposed consecutively at an end of the press-fit base portion 61 in one of the sides facing the fuel tank 10, has a central axis line formed linearly, and is formed as a circularly cylindrical shape. The bent section 62b is disposed consecutively at an end of the first linear section 62a in one of the sides facing the fuel tank 10, has a central axis line formed in a curved configuration, and is formed as an elliptically cylindrical shape. The second linear section 62c is disposed consecutively at an end of the bent section 62b in one of the sides facing the fuel tank 10, has a central axis line formed linearly, and is formed as a circularly cylindrical shape. That is, the non-press-fit base portion 62 has an inner peripheral face formed in a configuration that does not have any steps or bumps in the central-axis-line direction. Therefore, the liquid fuel, which is immediately after being supplied from the filler nozzle, distributes smoothly.

The tank-side base section 63 is arranged by way of the bellows 32 on one of the sides of the non-press-fit base section 62 facing the fuel tank 10. That is, the tank-side base section 63 is disposed consecutively at an end of the bellows 32 in one of the sides facing the fuel tank 10, has a central axis line formed in a linear configuration, and is formed as a circularly cylindrical shape. The tank-side base section 63 is provided with a rib 63a protruding outward radially in an annular shape. The tank-side base section 63 has a role of linking the bellows 32 with the heavy-thickness cylinder 34. That is, the tank-side base section 63 has a function of relieving the thickness of changing sharply between the bellows 32 and the heavy-thickness cylinder 34. In particular, the tank-side base section 63 having the rib 63a makes it possible to securely relieve the thickness of changing sharply, even when the tank-side base section 63 has a short axial length.

Figure 3:
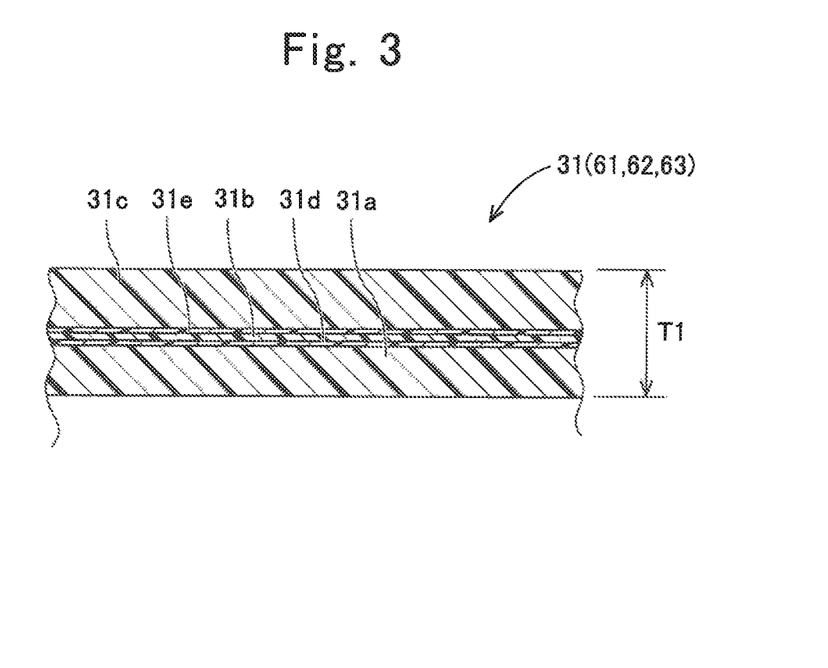
FIG. 3 is an enlarged axial cross-sectional diagram of a base shown in FIG. 1.

The base 31 has an axial cross section as shown in FIG. 3. In order to satisfy the shock resistance of the base 31, a total thickness "T1" of the base 31 is set to fall in a range of from 2 to 4 mm. The base 31 includes an inner layer 31a, an intermediate layer 31b, an outer layer 31c, an inner adhesive layer 31d adhering the inner layer 31a to the intermediate layer 31b, and an outer adhesive layer 31e adhering the intermediate layer 31b to the outer layer 31c.

Since the inner layer 31a makes a face touching the liquid fuel, a material exhibiting gasoline resistance is used therefor. Moreover, the inner layer 31a of the press-fit base section 61 needs to exhibit a hooking force (or come-off preventing force) with respect to the insertion portion 21 of the filler neck 20 in such a state as the press-fit base section 61 is press fitted around the insertion portion 21. Consequently, for the inner layer 31a of the base 31, a material exhibiting sealability is used. Hence, the inner layer 31a is formed of high-density polyethylene (or HDPE) serving as the major constituent. The inner layer 31a is formed in a thickness falling in a range of from 40 to 60% of the total thickness "T1" of the base 31.

The intermediate layer 31b is arranged on an outer peripheral side of the inner layer 31a, and exhibits fuel-permeation resistance property. The intermediate layer 31b is formed of a material exhibiting fuel-permeation resistance property, such as any of ethylene-vinyl alcohol copolymer (or EVOH) and polyamide-based (or PA-based) resin serving as the major constituent. The intermediate layer 31b is formed in a thickness falling in a range of from 1 to 10% of the total thickness "T1."

The outer layer 31c is arranged on an outer peripheral side of the intermediate layer 31b to protect the intermediate layer 31b. The outer layer 31c forms an outermost face of the filler tube 30. Consequently, for the outer layer 31c, a material exhibiting shock resistance, weatherability and chemical resistance is used. Hence, the outer layer 31c is formed of any of high-density polyethylene (or HDPE) and polyamide-based (or PA-based) resin serving as the major constituent. The outer layer 31c is formed in a thickness falling in a range of from 20 to 40% of the total thickness "T1."

The inner adhesive layer 31d is a layer adhering an outer peripheral face of the inner layer 31a to an inner peripheral face of the intermediate layer 31b. The outer adhesive layer 31e is a layer adhering an outer peripheral face of the intermediate layer 31b to an inner peripheral face of the outer layer 31c. The inner adhesive layer 31d and outer adhesive layer 31e are formed of modified polyethylene (or modified PE) serving as the major constituent, respectively. The inner adhesive layer 31d and outer adhesive layer 31e are formed in a thickness falling in a range of from 1 to 10% of the total thickness "T1," respectively. However, when one of the inner layer 31a and intermediate layer 31b exhibits adhesion performance with respect to the other one of them, the inner adhesive layer 31d becomes unnecessary. Moreover, when one of the intermediate layer 31b and outer layer 31c exhibits adhesion performance with respect to the other one of them, the outer adhesive layer 31e becomes unnecessary.

In distinction from the base 31, the bellows 32 is formed as a bellows-like cylindrical shape. The bellows 32 is disposed between the second linear section 62c, one of the constituent elements of the non-press-fit base portion 62, and the tank-side base portion 63. Specifically, the bellows 32 is disposed consecutively at one of the ends of the second linear section 62c (i.e., at an end in one of the sides facing the fuel tank 10), and is disposed consecutively at one of the ends of the tank-side base portion 63 (i.e., at an end in one of the sides opposite to (or across from) the fuel tank 10). The bellows 32 makes a site that can be easily deformed to bend by an operator or worker.

Figure 4:
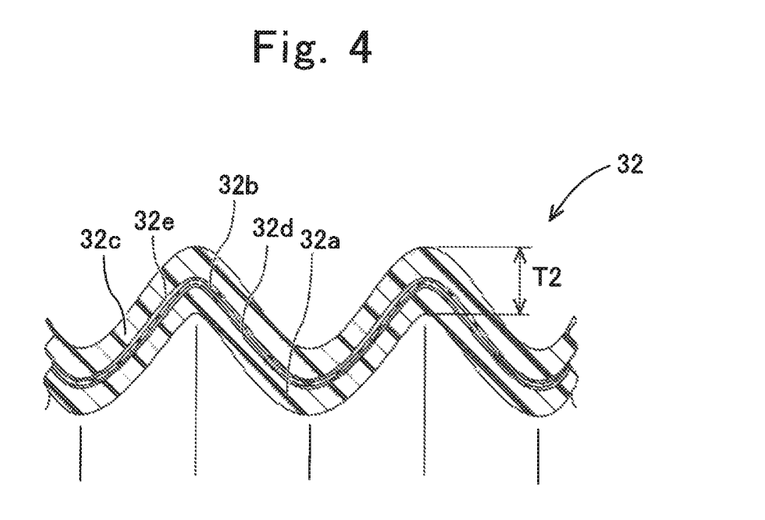
FIG. 4 is an enlarged axial cross-sectional diagram of a bellows shown in FIG. 1.

The bellows 32 has an axial cross section as shown in FIG. 4. In order to make the bellows 32 exhibit favorable bendability (or flexibility), a total thickness "T2" of the bellows 32 is set to fall in a range of from 0.5 to 3 mm. Moreover, the total thickness "T2" of the bellows 32 is equal to or less than the total thickness "T1" of the base 31. That is, the total thickness changes at the boundary between the second linear section 62c and the bellows 32, and at the other boundary between the tank-side base portion 63 and the bellows 32.

The bellows 32 includes an inner layer 32a, an intermediate layer 32b, an outer layer 32c, an inner adhesive layer 32d, and an outer adhesive layer 32e, in the same manner as the base 31. The respective layers 32a to 32e of the bellows 32 are formed of the same material as that of each of the respective layers 31a to 31e of the base 31, and proportions accounted by the respective layers 32a to 32e for the total thickness "T2" are also identical with the proportions in the base 31. That is, the thickness of the inner layer 32a is from 40 to 60% of the total thickness "T2"; the thickness of the intermediate layer 32b is from 1 to 10% of the total thickness "T2"; and the thickness of the outer layer 32c is from 20 to 40% of the total thickness "T2." Note herein that the bellows 32 makes the thinnest site in the filler tube 30. Consequently, in order to secure fuel-permeation resistance property over the entire length of the filler tube 30, a thickness proportion of the intermediate layer 32b is set up in compliance with the total thickness "T2" of the bellows 32.

The tapered locker 33 is formed as a tapered cylindrical shape enlarging radially toward a side of the fuel tank 10. The tapered locker 33 makes a site demonstrating a locking function with respect to a later-described outer peripheral mold 80 for molding the flange 35. The tapered locker 33 is disposed consecutively at an end of the tank-side base portion 63 in one of the sides facing the fuel tank 10. The tapered locker 33 has a thickness that changes so as to become thicker gradually as coming from the tank-side base portion 63 and arriving at the heavy-thickness cylinder 34. Note that, although no detailed explanations are made as to an axial cross section of the tapered locker 33, it is substantially the same as that of the base 31.

The heavy-thickness cylinder 34 is formed as a non-bellows-like cylindrical shape. In the present embodiment, the heavy-thickness cylinder 34 is formed as a circularly cylindrical shape, or an elliptically cylindrical shape. The heavy-thickness cylinder 34 is disposed consecutively at an end of the tapered locker 33 in one of the sides facing the fuel tank 10. Moreover, the heavy-thickness cylinder 34 is formed as a circularly cylindrical shape, and is disposed consecutively to the tank-side base portion 63. In the present embodiment, the heavy-thickness cylinder 34 is larger than the tank-side base portion 63 in both of the inside diameter and outside diameter.

Figure 5:
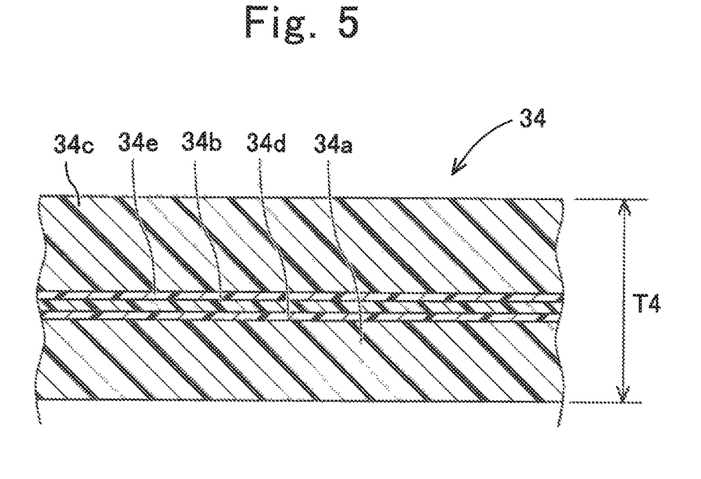
FIG. 5 is an enlarged axial cross-sectional diagram of a heavy-thickness cylinder shown in FIG. 1.

The heavy-thickness cylinder 34 has an axial cross section as shown in FIG. 5. In order to make the heavy-thickness cylinder 34 secure an axial force (namely, lest it should buckle) upon welding the flange 35 onto the fuel tank 10), a total thickness "T4" of the heavy-thickness cylinder 34 is set to fall in a range of from 4 to 6 mm. That is, the heavy-thickness cylinder 34 is thicker than the tank-side base portion 63 is.

The heavy-thickness cylinder 34 includes an inner layer 34a, an intermediate layer 34b, an outer layer 34c, an inner adhesive layer 34d, and an outer adhesive layer 34e, in the same manner as the base 31. The respective layers 34a to 34e of the heavy-thickness cylinder 34 are formed of the same material as that of each of the respective layers 31a to 31e of the base 31, and proportions accounted by the respective layers 34a to 34e for the total thickness "T4" are also identical with the proportions in the base 31. That is, the thickness of the inner layer 34a is from 40 to 60% of the total thickness "T4"; the thickness of the intermediate layer 34b is from 1 to 10% of the total thickness "T4"; and the thickness of the outer layer 34c is from 20 to 40% of the total thickness "T4."

The flange 35 protrudes outward radially from an end of the heavy-thickness cylinder 34 in one of the sides facing the fuel tank 10. Note herein that, the term, "outward radially" referred to herein not only means the outward direction orthogonally crossing the central axis line of the heavy-thickness cylinder 34 alone, but also means directions involving components of the orthogonally-crossing outward direction. The flange 35 includes a tapered portion 71, and a circularly annular plate-shaped portion 72. The tapered portion 71 enlarges radially toward the fuel tank 10 from an end of the heavy-thickness cylinder 34 in one of the sides facing the fuel tank 10. That is, the tapered portion 71 spreads outward radially from the end of the heavy-thickness cylinder 34. The circularly annular plate-shaped portion 72 elongates outward radially from an end of the tapered portion 71 in one of the sides facing the fuel tank 10. The circularly annular plate-shaped portion 72 has an end face that comes into contact with the fuel tank 10, and which is to be welded to the fuel tank 10.

Figure 6:
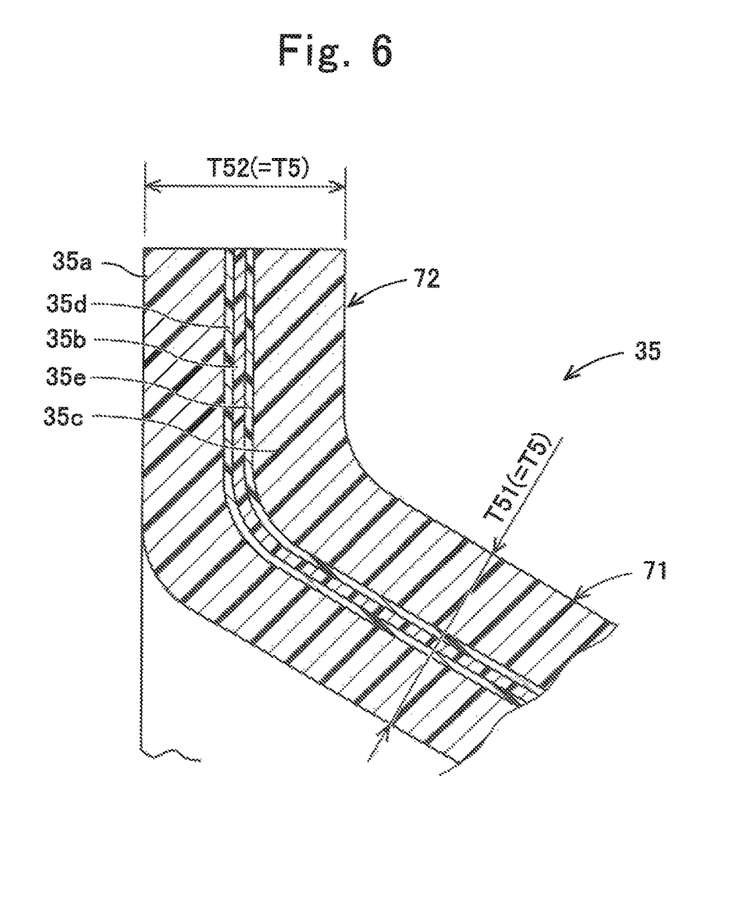
FIG. 6 is an enlarged cross-sectional diagram of a flange shown in FIG. 1.

The flange 35 has an axial cross section as shown in FIG. 6. A total thickness of the flange 35 is set to fall in a range of from 3.5 to 5 mm. However, the total thickness "T5" of the flange 35 is thinner than the total thickness "T4" of the heavy-thickness cylinder 34. Note herein that the flange 35 includes the tapered portion 71, and the circularly annular plate-shaped portion 72, as described above. That is, the total thickness "T51" of the tapered portion 71, and the total thickness "T52" of the circularly annular plate-shaped portion 72 are thinner than the total thickness "T4" of the heavy-thickness cylinder 34. Moreover, the total thickness "T52" of the circularly annular plate-shaped portion 72 is thinner than the total thickness "T51" of the tapered portion 71. That is, the total thicknesses become thinner in the following order: the heavy-thickness cylinder 34, the tapered portion 71, and the circularly annular plate-shaped portion 72.

The flange 35 (i.e., the tapered portion 71 and circularly annular plate-shaped portion 72) includes an inner layer 35a, an intermediate layer 35b, an outer layer 35c, an inner adhesive layer 35d, and an outer adhesive layer 35e, in the same manner as the base 31. The respective layers 35a to 35e of the flange 35 are formed of the same material as that of each of the respective layers 31a to 31e of the base 31, and proportions accounted by the respective layers 35a to 35e for the total thickness "T5" (e.g., "T51," or "T52") are also identical with the proportions in the base 31. That is, the thickness of the inner layer 35a is from 40 to 60% of the total thickness "T5" (e.g., "T51," or "T52"); the thickness of the intermediate layer 35b is from 1 to 10% of the total thickness "T5" ("T51," or "T52"); and the thickness of the outer layer 35c is from 20 to 40% of the total thickness "T5" (e.g., "T51," or "T52").

Note herein that the circularly annular plate-shaped portion 72 needs to secure welding strength between itself and the fuel tank 10. Hence, a material suitable for welding is set to make the inner layer 35a of the flange 35. That is, in consideration of the welding performance, the inner layer 35a is formed of high-density polyethylene (or HDPE) serving as the major constituent.

Moreover, weld strength depends on the thickness of the inner layer 35a. Hence, in order to make the thickness of the inner layer 35a a thickness exhibiting necessary weld strength, the total thickness "T5" of the flange 35 is set to fall in a range of from 3.5 to 5 mm, and the inner layer 35a is set to account for 40% or more of the total thickness "T5." In particular, the total thickness "T52" of the circularly annular plate-shaped portion 72 is set to fall in a range of from 3.5 to 5 mm, and the inner layer 35a is set to account for 40% or more of the total thickness "T52."

However, the inner layer 35a comprising a material suitable for welding is inferior to the intermediate layer 35b as for the fuel-permeation resistance property. Moreover, in the circularly annular plate-shaped portion 72 of the flange 35, the inner layer 35a exists between a surface of the fuel tank 10 and the intermediate layer 35b of the flange 35. That is, the inner layer 35a demarcates between the distribution region of the liquid fuel in the filler tube 30 and the outside region. Consequently, the thinner the thickness of the inner layer 35a is, the higher the fuel-permeation resistance property becomes in the circularly annular plate-shaped portion 72 of the flange 35. Hence, setting the thickness of the inner layer 35a to account for 60% or less of the total thickness "T5" (i.e., "T52") enables the inner layer 35a to secure post-welding fuel-permeation resistance property.

(3) Manufacturing Process for Filler Tube 30

Explanations will be hereinafter made on a manufacturing process for the filler tube 30 with reference to the flowchart shown in FIG. 7, and to FIG. 8 to FIG. 11. First of all, extrusion blow molding (or corrugation molding) using a corrugated mold is carried out to mold a primary molded body 130, which is illustrated in FIG. 8, (i.e., the primary molding step labeled "S1").

The primary molded body 130 comprises the base 31, bellows 32 and tapered locker 33 that are illustrated in FIG. 2. Moreover, the primary molded body 130 further comprises a cylindrical to-be-molded portion 130a that makes a part involving the heavy-thickness cylinder 34 and flange 35, and which serves as a site before the flange 35 is flare molded. Note herein that the heavy-thickness cylinder 34 of the primary molded body 130 is identical with the heavy-thickness cylinder 34 of the filler tube 30 that is illustrated in FIG. 2.

The to-be-molded portion 130a is formed as a circularly cylindrical shape whose thickness is identical with that of the heavy-thickness cylinder 34, and whose configuration is identical with that of the heavy-thickness cylinder 34. However, the flange 35 has a thickness that is thinner than the thickness (equal to the thickness of the heavy-thickness cylinder 34) that the to-be-molded portion 130a of the primary molded body 130 has, because the to-be-molded portion 130a is to be subjected to flare molding.

Note herein that the total thickness of the primary molded body 130 differs depending on the sites. Moreover, the thickness of each of the layers in the primary molded body 130 also differs depending on the sites. However, since the primary molded body 130 is formed by extrusion blow molding, the proportion of each of the layers accounting for the total thickness in the primary molded body 130 is an identical proportion virtually wherever the sites are in the primary molded body 130. For example, the proportion of the inner layer 31a in the base 31 accounting for the total thickness "T1," and the proportion of the inner layer 32a in the bellows 32 accounting for the total thickness "T2" are identical with one another virtually.

Figure 9:
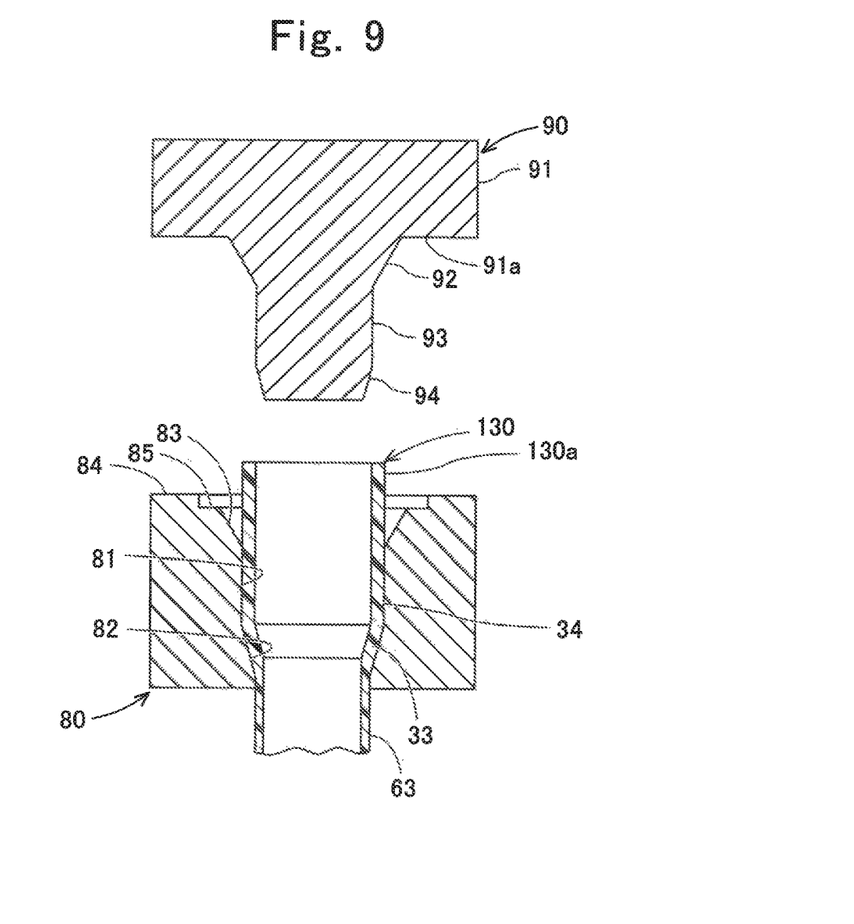
FIG. 9 is a diagram illustrating a primary-molded-body arrangement step at "S3" shown in FIG. 7.

An outer peripheral mold 80 for flare molding the flange 35, and an inner peripheral mold 90 are subsequently amounted onto a pressing-apparatus main body (not shown), as shown in FIG. 9, (i.e., the molds installation step "S2" shown in FIG. 7). Note herein that the outer peripheral mold 80 is used as a lower mold, and the inner peripheral mold 90 is used as an upper mold. Moreover, the outer peripheral mold 80, and the inner peripheral mold 90 are separated off one another in the up/down direction.

The outer peripheral mold 80 is constructed of multiple divisional molds, and is formed as a cylindrical shape as a whole. An inner peripheral face of the outer peripheral mold 80 includes: a circularly-cylindrical inner-peripheral face 81; a first tapered face 82 formed continuously below the circularly-cylindrical inner-peripheral face 81 (on one of the sides getting away from the inner peripheral mold 90), and reduced more radially as it goes more downward; and a second tapered face 83 formed continuously above the circularly-cylindrical inner-peripheral face 81 (on another one of the sides approaching the inner peripheral mold 90), and enlarged more radially as it goes more upward.

Note herein that the circularly-cylindrical inner-peripheral face 81 corresponds to the heavy-thickness cylinder 34 of the primary molded body 130, and contacts with the outer peripheral face of the heavy-thickness cylinder 34. The first tapered face 82 corresponds to the tapered locker 33 of the primary molded body 130, and contacts with the outer peripheral face of the tapered locker 33. That is, the first tapered face 82 functions as a to-be-locked portion for inhibiting the primary molded body 130 from moving downward in FIG. 9, in such a state as it contacts with the tapered locker 33 of the primary molded body 130. Therefore, the first tapered face 82 serving as a to-be-locked portion is locked in the axial direction with respect to the tapered locker 33 serving as a locking portion.

The second tapered face 83 is located at an axial position corresponding to the to-be-molded portion 130a of the primary molded body 130, and is kept away from the outer peripheral face of the to-be-molded portion 130a. The second tapered face 83 makes a site for molding the tapered portion 71 of the post-flare-molding flange 35.

An upper end face of the outer peripheral mold 80 (i.e., one of the faces opposing the inner peripheral mold 90) is provided with: a stopper plane face 84 located on an outer peripheral side in an entirely circumferential shape; and a counter-welding-face forming portion 85 formed as a circularly dented shape on an inner peripheral side of the stopper plane face 84 over the entire circumference. The counter-welding-face forming portion 85 is formed continuously to the second tapered face 83. Moreover, a bottom face of the counter-welding-face forming portion 85 is formed as a plane-face shape parallel to the stopper plane face 84. The counter-welding-face forming portion 85 makes a site for molding a counter-welding face in the circularly annular plate-shaped portion 72 of the post-flare-molding flange 35.

The inner peripheral mold 90 includes: a body portion 91; a first tapered face 92 protruding downward (i.e., toward a side of the outer peripheral mold 80) from the center of the body portion 91 while reducing radially; a circularly cylindrical face 93 protruding from the leading end of the first tapered face 92 coaxially to be formed as a circularly cylindrical shape; a second tapered face 94 extending coaxially from the leading end of the circularly cylindrical face 93 to be reduced radially.

Note herein that the body portion 91 is provided with a welding-face forming portion 91a for making a face that opposes the stopper plane face 84 and counter-welding-face forming portion 85 in the outer peripheral mold 80, and which forms a welding face in the flange 35. The welding-face forming portion 91a contacts with the stopper plane face 84 to exhibit a function of inhibiting relative movements between the outer peripheral mold 80 and inner peripheral mold 90. Moreover, the welding-face forming portion 91a is formed so as to separate off in the up/down direction with respect to the counter-welding-face forming portion 85, in such a state as it contacts with the stopper plane face 84.

The first tapered face 92 makes a site for forming the tapered portion 71 of the post-flare-molding flange 35. The circularly cylindrical face 93 corresponds to the heavy-thickness cylinder 34 of the primary molded body 130, and is capable of contacting with the heavy-thickness cylinder 34 on the inner peripheral face. The second tapered face 94 corresponds to the tapered locker 33 of the primary molded body 130, and is capable of contacting with the tapered locker 33 on the inner peripheral face.

After the molds installation step, the primary molded body 130 is subsequently arranged onto the outer peripheral mold 80, as shown in FIG. 9, (i.e., the primary-molded-body arrangement step "S3" shown in FIG. 7). The tapered portion 33 of the primary molded body 130 contacts with the first tapered face 82 of the outer peripheral mold 80, and then the primary molded body 130 is inhibited from moving downward in the axial direction with respect to the outer peripheral mold 80. On this occasion, the heavy-thickness cylinder 34 of the primary molded body 130 contacts with the circularly-cylindrical inner-peripheral face 81 of the outer peripheral mold 80. That is, the outer peripheral mold 80 not only causes the first tapered face 82 of the outer peripheral mold 80 to axially lock to the tapered locker 33 of the primary molded body 130, but also supports the tapered locker 33 and heavy-thickness cylinder 34 of the primary molded body 130 on the outer peripheral face.

On this occasion, the second tapered face 83 and counter-welding-face forming portion 85 of the outer peripheral mold 80 come not to contact with the to-be-molded portion 130a of the primary molded body 130. Moreover, the outer peripheral mold 80 is set at a predetermined temperature when the primary molded body 130 is arranged. In the present embodiment, the term, a "predetermined temperature," refers to an ordinary temperature (or room temperature), and is 25° C. approximately, for instance. That is, the outer peripheral mold 80 has not been warmed at this moment.

Figure 10:
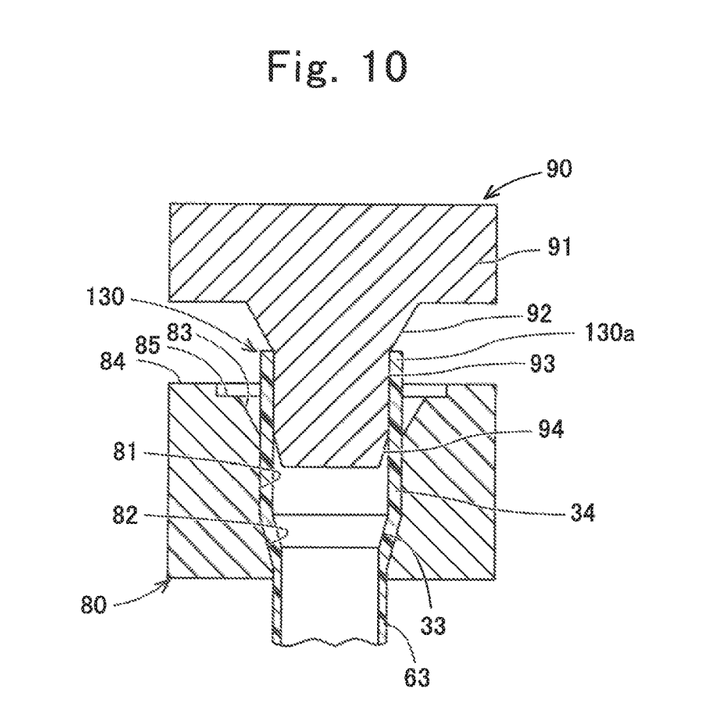
FIG. 10 is a diagram illustrating a warming step at "S4" shown in FIG. 7.

After completing the primary-molded-body arrangement step as shown in FIG. 10, the inner peripheral mold 90 is subsequently set at a higher temperature than the temperature of the outer peripheral mold 80. The temperature of the inner peripheral mold 90 is not only a temperature that enables sites corresponding to at least the inner layer 35a of the flange 35 to soften to such an extent as the sites can be flare molded, in such a state as the inner peripheral mold 90 is made to contact with the primary molded body 130; but also a temperature at which the respective layers 35a to 35e constructing the flange 35 maintain the multi-layered structure at the corresponding sites. In the present embodiment, the inner peripheral mold 90 has a temperature that is sufficiently lower than the softening point of the intermediate layer 35b.

Figure 7:
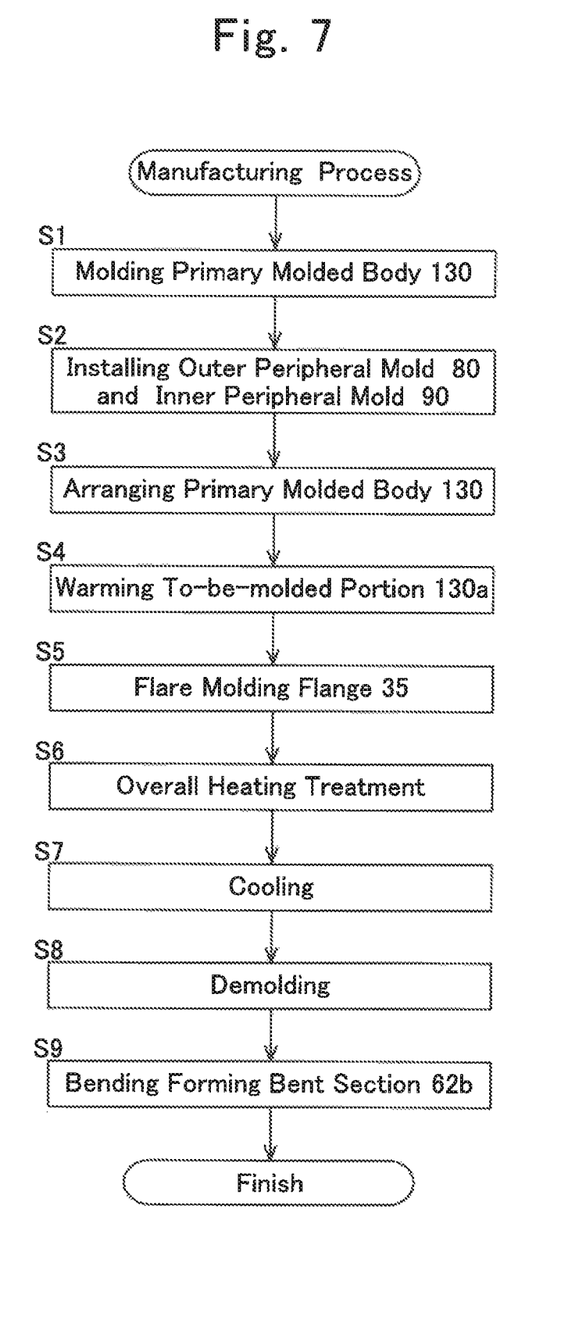
FIG. 7 is a flowchart illustrating a manufacturing process for the filler tube.
Figure 8:
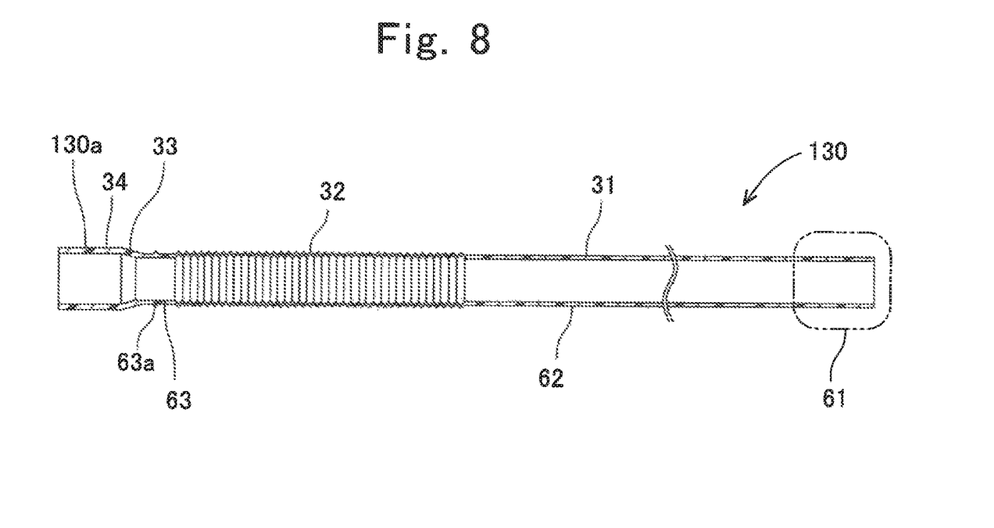
FIG. 8 is an enlarged axial cross-sectional diagram of a primary molded body before flare molding the filler tube shown in FIG. 2.

Moreover, the higher-temperature inner peripheral mold 90 is made to approach to insert the second tapered face 94 of the inner peripheral mold 90 through the opening in the to-be-molded portion 130a of the primary molded body 130. In addition, the inner peripheral mold 90 is made to further approach the outer peripheral mold 80 in order to cause the circularly cylindrical face 93 of the inner peripheral mold 90 to contact with the to-be-molded portion 130a of the primary molded body 130 over the entire length, as shown in FIG. 10. Maintaining the state for a predetermined period of time leads to warming the to-be-molded portion 130a of the primary molded body 130 (i.e., the warming step "S4"

shown in FIG. 7). On this occasion, sites corresponding to all of the layers 35a to 35e constructing the flange 35 are not at all softened to mix with each other. However, the sites corresponding to the inner layer 35a especially become softer, though, while maintaining the multi-layered structure.

On this occasion, the outer peripheral mold 80 is located at a position at which it does not contact with the to-be-molded portion 130a. Moreover, the outer peripheral mold 80 is being kept at an ordinary temperature even at this moment. Consequently, although the primary molded body 130 is warmed by the inner peripheral mold 90, it is not warmed at all by the outer peripheral mold 80.

Figure 11:
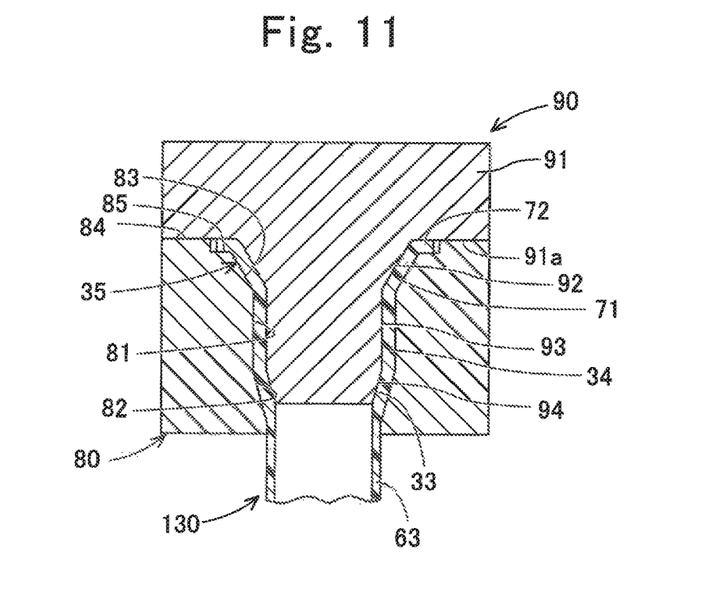
FIG. 11 is a diagram illustrating a flare-molding step at "S5" shown in FIG. 7.

After the warming step, the inner peripheral mold 90 is subsequently made to further approach the outer peripheral mold 80 so that the inner peripheral mold 90 is moved downward until it makes such a state as the welding-face forming portion 91a in the body portion 91 of the inner peripheral mold 90 contacts with the stopper plane face 84 of the outer peripheral mold 80, as shown in FIG. 11. The inner peripheral mold 90 is thus moved from the position during the warming step to another position at which it contacts with the outer peripheral mold 80. Moreover, the inner peripheral mold 90 is holdup for a predetermined period of time at the position at which it has contacted with the outer peripheral mold 80.

That is, the to-be-molded portion 130a of the primary molded body 130 is deformed along the first tapered face 92 and welding-face forming portion 91a of the inner peripheral mold 90 so that the flange 35 is flare molded by the first tapered face 92 and welding-face forming portion 91a of the inner peripheral mold 90, and by the second tapered face 83 and counter-welding-face forming portion 85 of the outer peripheral mold 80 (i.e., the flare-molding step "S5" shown in FIG. 7).

To put the above in detail, the first tapered face 92 of the inner peripheral mold 90, first of all, deforms the to-be-molded portion 130a of the primary molded body 130 to enlarge radially along the second tapered face 83, while contacting with the inner peripheral face in the to-be-molded portion 130a of the primary molded body 130. Moreover, when the welding-face forming portion 91a of the inner peripheral mold 90 contacts with one of the ends in the molded body 130a of the primary molded body 130, the welding-face forming portion 91a of the inner peripheral mold 90 deforms the to-be-molded portion 130a of the primary molded body 130 to further enlarge radially along the welding-face forming portion 91a.

If so, a part of the to-be-molded portion 130a of the primary molded body 130 forms the tapered portion 71 of the flange 35 because of being clamped between the second tapered face 83 of the outer peripheral mold 80 and the first tapered face 92 of the inner peripheral mold 90 in the radial direction. Moreover, another part of the to-be-molded portion 130a of the primary molded body 130 forms the circularly annular plate-shaped portion 72 of the flange 35 because of being clamped between the counter-welding-face forming portion 85 of the outer peripheral mold 80 and the welding-face forming portion 91a of the inner peripheral mold 90 in the axial direction.

Moreover, the to-be-molded portion 130a becomes softer on the inner layer side, because the inner peripheral mold 90 warms the to-be-molded portion 130a on the inner layer side. However, the to-be-molded portion 130a is less likely to become softer on the outer layer side compared with the inner layer side. Consequently, although the to-be-molded portion 130a is in a state of being likely to flow on the inner layer side, it becomes comparatively less likely to flow on the outer layer side.

Therefore, upon subjecting the to-be-molded portion 130a of the primary molded body 130 to flare molding, the inner layer, which is likely to flow, tries to flow downward in the weight direction. However, when the other site equivalent to the circularly annular plate-shaped portion 72 of the flange 35 is flare molded, the site does not fluidize, for example, to such an extent as it flows toward the bottom face in the counter-welding-face forming portion 85 of the outer peripheral mold 80, because the inner layer of the primary molded body 130 locates up above in the gravity direction. Therefore, the flange 35 is molded securely.

Note herein that, upon flare molding the flange 35 by the outer peripheral mold 80 and inner peripheral mold 90 as aforementioned, the inner peripheral mold 90 generates a force thrusting the to-be-molded portion 130a of the primary molded body 130 downward in the axial direction. The force is transmitted between the outer peripheral mold 80 and the primary molded body 130 as well. If the primary molded body 130 should have suffered from positional displacements occurred with respect to the outer peripheral mold 80 in the axial direction, it is not possible to form the flange 35 at a desired location. Consequently, in such an instance as upon flare molding the to-be-molded portion 130a of the primary molded body 130 by the inner peripheral mold 90, the outer peripheral mold 80 needs to retain the location of the primary molded body 130 in the axial direction.

Hence, the tapered locker 33 of the primary molded body 130, and the first tapered face 82 of the outer peripheral mold 80 lock to one another, so that the outer peripheral mold 80 retains the axial location of the primary molded body 130. Note herein that a force of locking between the outer peripheral mold 80 and the primary molded body 130 depends on the frictional force between the two. Consequently, the higher temperature the two has, the lower the frictional force declines.

However, the outer peripheral mold 80 shall still no be warmed actively at the flare-molding step. Due to the inner peripheral mold 90 approaching the outer peripheral mold 80, the heat of the inner peripheral mold 90 is transmitted to the surroundings by way of the primary molded body 130. However, even in such a state as the heat is transmitted to the outer peripheral mold 80, the outer peripheral mold 80 has a temperature that is fully lower than the temperature of the inner peripheral mold 90. Consequently, the frictional force between the two becomes higher sufficiently, so that displacements are less likely to occur in the relative locations between the outer peripheral mold 80 and the primary molded body 130 in the axial direction. Therefore, the flange 35 is flare molded at a desired location.

While keeping such a state as the primary molded body 130 is clamped between the outer peripheral mold 80 and the inner peripheral mold 90 as shown in FIG. 11, they are subsequently removed from the not-shown pressing-apparatus body. The removed unit (130, 80, 90) is put in a bath with a predetermined temperature for a predetermined period of time in order to carry out an overall heating treatment to the primary molded body 130 (i.e., the overall heating step "S6" shown in FIG. 7). In this instance, the entire primary molded body 130 is heated, differently from the occasions during the above-described warming step and flare-molding step. This overall heating step eliminates internal stresses in the primary molded body 130.

The primary molded body 130, which is being kept in the state where it is clamped between the outer peripheral mold 80 and the inner peripheral mold 90, is subsequently cooled (i.e., the cooling step "S7" shown in FIG. 7), and then the outer peripheral mold 80 and inner peripheral mold 90 are removed from the primary molded body 130 (i.e., the demolding step "S8" shown in FIG. 7). In this way, a secondary molded body is completed (i.e., the secondary molding steps "S2" to "S8" shown in FIG. 7).

Bending forming is subsequently carried out to the secondary molded body to form the bent section 62b by bending with a bending forming machine (not shown) (i.e., the bending step "S9" shown in FIG. 7). At the bending step, an outer peripheral face of the non-press-fit base portion 62 is thrusted onto a thrusting member (not shown) to form the bent portion 62b under such a condition as a mandrel (not shown) has been inserted into the inside of the filler tube 30. Thus, the filler tube 30 is completed. Note that the press-fit base portion 6l has, at this moment, the same configuration as that of the first linear section 62a of the non-press-fit base portion 62. However, the press-fit base portion 62 is enlarged radially, as described above, by means of inserting the insertion portion 21 of the filler neck 20 into the press-fit base portion 62.

Moreover, not limited to the above-mentioned order of the steps, the following will also do: carrying out the "bending step" labeled "S9" after the "flare-molding step" labeled "S5"; and carrying out the bending operation for forming the bent section 62b at the same time as the time during which the primary molded body 130 undergoes the overall heating treatment at the "overall heating step" labeled "S6." If such is the case, it is allowable to carry out the bending operation for forming the bent section 62b inside a bath with a predetermined temperature, under such a condition as the outer peripheral mold 80 and inner peripheral mold 90 keep clamping the primary molded body 130 at one of the ends.

(4) Advantageous Effects of Present Embodiment

The above-described filler tube 30 is made of thermoplastic resin, and is to be welded to the fuel tank 10 at the opening 11. Prior to be welded, the filler tube 30 comprises: a non-bellows cylindrical base 31 with a total thickness of from 2 to 4 mm; a bellows 32 with a total thickness of from 0.5 to 3 mm; a flange 35 having a total thickness of from 3.5 to 5 mm, and including an end face to be welded to the fuel tank 10.

The base 31, the bellows 32, and the flange 35 includes: the inner layers (31a, 32a, 35a) formed so as to have a thickness accounting for from 40 to 60% of the total thicknesses, and formed of high-density polyethylene (or HDPE) serving as the major constituent; the intermediate layers (31b, 32b, 35b) arranged on the outer peripheral side of the inner layers (31a, 32a, 35a), and exhibiting fuel-permeation resistance property; and the outer layers (31c, 32c, 35c) arranged on the outer peripheral side of the intermediate layers (31b, 32b, 35b), and protecting the intermediate layers (31b, 32b, 35b).

HDPE is satisfactory in the welding performance to the fuel tank 10 made of resin. Moreover, the flange 35 is formed to have a total thickness "T5" falling in a range of from 3.5 to 5 mm, and includes the inner layer 35a having a thickness accounting for 40% or more of the total thickness "T5," and is formed of HDPE serving as the major constituent. The inner layer 35a of the flange 35 is located at the end face, and makes a site contacting with the fuel tank 10. That is, the inner layer 35a of the flange 35 has a thickness to such an extent as being capable of securing necessary weld strength.

Moreover, the inner layer 35a, which is included in the flange 35 to exist between the surface of the fuel tank 10 and the intermediate layer 35b of the flange 35, exhibits low fuel-permeation resistance property, compared with that of the intermediate layer 35b. However, the inner layer 35a of the flange 35 has a thickness accounting for 60% or less of the total thickness "T5." Therefore, in such as state as the inner layer 35a of the flange 35 is welded to the fuel tank 10, the inner layer 35a of the flange 35 has a thickness that is fully small. Consequently, it is possible to secure fuel-permeation resistance property sufficiently at the site of the inner layer 35a in the flange 35.

In addition, the base 31 is formed to have a total thickness "T1" falling in a range of from 2 to 4 mm. Therefore, the base 31 exhibits required shock resistance securely. Meanwhile, the bellows 32 is formed to have a total thickness "T2" falling in a range of from 0.5 to 3 mm. Moreover, the bellows 32 is thinner than the base 31. Consequently, it becomes feasible to make handling or laying out the filler tube 30 easier, because the bellows 32 exhibits satisfactory bendability. However, the bellows 32 exhibits low shock-resistance performance, because it has a thin total thickness "T2," compared with that of the base 31. However, arranging the bellows 32 suffices at a location in which shock resistance is not needed so much, but in which the bent arrangement is required.

Moreover, the intermediate layers (31b, 32b, 34b, 35b) are formed of any of ethylene-vinyl alcohol copolymer (or EVOH) and polyamide-based (or PA-based) resin serving as the major constituent. The outer layers (31c, 32c, 34c, 35c) are formed of any of high-density polyethylene (or HDPE) and polyamide-based (or PA-based) resin serving as the major constituent. Thus, the filler tube 30 securely exhibits fuel-permeation resistance property required for the intermediate layers (31b, 32b, 34b, 35b), and shock resistance, and the like, required for the outer layers (31c, 32c, 34c, 35c).

In addition, the filler tube 30 further comprises: the non-bellows-shaped heavy-thickness cylinder 34 whose total thickness "T4" is from 4 to 6 mm; and the flange 35 protrudes outward radially from an end of the heavy-thickness cylinder 34 in one of sides facing the fuel tank 10. Thus, the boundary site between the flange 35 and the heavy-thickness cylinder 34 can maintain such a state as it exhibits sufficient strength, in such a case as the flange 35 is flare molded. Moreover, an axial force is given to the heavy-thickness cylinder 34 so that the flange 35 is securely welded to the fuel tank 10, in such an instance as welding the flange 35 onto the fuel tank 10. In addition, even when an axial force is given to the heavy-thickness cylinder 34, it is possible to transmit the axial force to the flange 35 securely without ever buckling the heavy-thickness cylinder 34, because the heavy-thickness cylinder 35 is thick sufficiently.

Moreover, the flange 35 is formed thinner than the heavy-thickness cylinder 34 is. Thus, not only it is possible to make the thickness of the inner layer 35a of the flange 35 smaller in such a range as making the weld strength securable, but also it is possible to transmit an axial force to the flange 35 without ever buckling the heavy-thickness cylinder 34. That is, the filler tube 30 can be securely welded to the fuel tank 10 while making the fuel-permeation resistance property satisfactory.

In addition, the flange 35 further includes: the tapered portion 71 enlarging radially from the end of the heavy-thickness cylinder 34 in the one of the sides facing the fuel tank 10; and the circularly annular plate-shaped portion 72 elongating outward radially from an end of the tapered portion 71 in one of the sides facing the fuel tank 10. In this instance, the circularly annular plate-shaped portion 72 makes a site to be welded to the fuel tank 10. Moreover, the tapered portion 71 comes to exist between the heavy-thickness cylinder 34 and the circularly annular plate-shaped portion 72. Therefore, it is possible to absorb any thickness differences between the heavy-thickness cylinder 34 and the circularly annular plate-shaped portion 72. That is, it is possible to secure high weld strength between the heavy-thickness cylinder 34 and the circularly annular plate-shaped portion 72, because no sudden thickness differences arise between them.

Moreover, the tapered portion 71, and the circularly annular plate-shaped portion 72 are formed thinner than the heavy-thickness cylinder 34 is; and the circularly annular plate-shaped portion 72 is formed thinner than the tapered portion 71 is. Thus, it is possible to securely prevent any sudden thickness differences from arising at the interspace between the heavy-thickness cylinder 34 and the circularly annular plate-shaped portion 72. Therefore, it is possible to secure high weld strength reliably.

In addition, the filler tube 30 further comprises the tank-side base portion 63 disposed consecutively at an end of the bellows 32 in one of the sides facing the fuel tank 10, disposed in another one of the sides of the heavy-thickness cylinder 34 opposite (or across from) to the fuel tank 10, and serving as part of the base 31. The tank-side base portion 63 has a role of linking the bellows 32 with the heavy-thickness cylinder 34. That is, the tank-side base portion 63 has a role of relieving any sudden thickness changes between the bellows 32 and the heavy-thickness cylinder 34.

Moreover, the tank-side base portion 63 is provided with the rib 63a protruding in an annular shape outward radially. In particular, even when the tank-side base portion 63 has a short axial length, it is possible to securely relieve any sudden thickness changes, due to the tank-side base portion 63 that has the rib 63a.

In addition, the filler tube 30 further comprises: the press-fit base portion 61 disposed at an end of the filler tube 30 in one of the sides opposite to (or across from) the fuel tank 10, making a site into whose inside the insertion portion 21 of the filler neck 20 serving as a mating member is press fitted, and serving as part of the base 31; and the non-press-fit base portion 62 disposed consecutively to the press-fit base portion 61, and serving as another part of the base 31.

In such a state as the insertion portion 21 is not inserted into the press-fit base portion 61, no definite boundary exists between the press-fit base portion 61 and the non-press-fit base portion 62, as described above. Hence, upon handling or laying out the filler tube 30 within an automobile, it becomes feasible to adjust the ends of the filler tube 30 regarding the locations. That is, even when the filler tube 30 is cut off at one of the ends in one of the sides facing the filler neck 20, it is possible to secure a length, which is no less than for inserting the insertion portion 21 of the filler neck 20 into it, for the filler tube 30 at the end in the one of the sides. Therefore, it is possible to secure a sufficient length for the press-fit base portion 61. In this instance, the non-press-fit base portion 62 has only a slightly shortened length. Thus, it becomes easy to adjust the ends regarding the locations during handling or laying out the filler tube 30.

Moreover, the non-press-fit base portion 62 is provided with the bent section 62b whose central axis line is curved. The filler tube 30 comprises a site whose central axis line is curved. The bellows 32 makes some of the site. However, not making all the curved site of the bellows 32, but making the curved site on one of the sides, which is close to the filler neck 20, of the non-bellows cylindrical base 31, not the bellows 32, result in making the liquid-fuel distribution satisfactory.

In addition, the manufacturing process for the filler tube 30 in the aforementioned embodiment comprises the primary molding step "S1" of using a corrugated mold to mold the primary molded body 130 by corrugation molding; and the secondary molding steps "S2" to "S8" of using the outer peripheral mold 80 and inner peripheral mold 90 to mold the filler tube 30 by performing press processing to the primary molded body 130.

Moreover, the secondary molding steps "S2" to "S8" include: the primary-molded-body arrangement step "S3" of arranging the primary molded body 130 onto the outer peripheral mold 80 so as to make the outer peripheral mold 80, which is set at a predetermined temperature, support an outer peripheral face in the heavy-thickness cylinder 34 of the primary molded body 130; and the flare-molding step "S5" of flare molding the flange 35 by inserting the inner peripheral mold 90, which is set at a higher temperature than the predetermined temperature of the outer peripheral mold 80, into an inner peripheral side of the to-be-molded portion 130a after the primary-molded-body arrangement step "S3," and by relatively moving the outer peripheral mold 80 and inner peripheral mold 90 in the axial direction to make an end face of the outer peripheral mold 80 and the inner peripheral mold 90 clamp the to-be-molded portion 130a between them in the axial direction.

The flange 35 is molded by flare molding the cylindrical to-be-molded portion 130a in the primary molded body 130. On this occasion, the following are used: the outer peripheral mold 80 supporting the filler tube 30 on the outer peripheral side; and inner peripheral mold 90 supporting it on the inner peripheral side. Note herein that, at the flare-molding step "S5," the inner peripheral mold 90 is set at a higher temperature than that of the outer peripheral mold 80. That is, the inner peripheral mold 90 warms the to-be-molded portion 130a of the primary molded body 130 to turn it into a state of being likely to be flare molded.

Meanwhile, at the flare-molding step "S5," the outer peripheral mold 80 has a lower temperature than the inner peripheral mold 90 does. The outer peripheral mold 80 is a mold onto which the primary molded body 130 has been arranged prior to the flare-molding step "S5." That is, even when the inner peripheral mold 90 is set at a higher temperature relatively at the flare-molding step "S5," the primary molded body 130 does not turn into a state of being likely to deform at the sites contacting with the outer peripheral mold 80 because the outer peripheral mold 80 has a lower temperature, so that displacements are less likely to occur in the relative positions between the outer peripheral mold 80 and the primary molded body 130. Therefore, the flange 35 is flare molded at a desired position.

What is claimed is:
1. A filler tube to be welded to a fuel tank at an opening thereof, and made of thermoplastic resin;
prior to being welded, the filler tube comprising:
a non-bellows cylindrical base with a total thickness of from 2 to 4 mm;
a bellows with a total thickness of from 0.5 to 3 mm;
a flange having a total thickness of from 3.5 to 5 mm, and including an end face to be welded to the fuel tank; and
a non-bellows-shaped heavy-thickness cylinder with a total thickness of from 4 to 6 mm;

the base, the bellows and the flange including:
an inner layer formed so as to have a thickness accounting for from 40 to 60% of the total thicknesses, and formed of high-density polyethylene (or HDPE) serving as a major constituent thereof;
an intermediate layer arranged on an outer peripheral side of the inner layer, and exhibiting fuel-permeation resistance property;
an outer layer arranged on an outer peripheral side of the intermediate layer, and protecting the intermediate layer; and
the flange protrudes outward radially from an end of the heavy-thickness cylinder in one of sides thereof facing the fuel tank.

2. The filler tube according to claim 1, wherein:
the intermediate layer is formed of any of ethylene-vinyl alcohol copolymer (or EVOH) and polyamide-based (or PA-based) resin serving as a major constituent thereof; and
the outer layer is formed of any of high-density polyethylene (or HDPE) and polyamide (or PA-based) resin serving as a major constituent thereof.

3. The filler tube according to claim 1, wherein the flange is formed thinner than the heavy-thickness cylinder is.

4. The filler tube according to claim 3, wherein the flange further includes:
a tapered portion enlarging radially from the end of the heavy-thickness cylinder in the one of the sides facing the fuel tank; and
a circularly annular plate-shaped portion elongating outward radially from an end of the tapered portion in one of sides thereof facing the fuel tank.

5. The filler tube according to claim 4, wherein:
the tapered portion, and the circularly annular plate-shaped portion are formed thinner than the heavy-thickness cylinder is; and
the circularly annular plate-shaped portion is formed thinner than the tapered portion is.

6. The filler tube according to claim 1, further comprising a tank-side base portion disposed consecutively at an end of the bellows in one of sides thereof facing the fuel tank, disposed in another one of the sides of the heavy-thickness cylinder opposite to the fuel tank, and serving as part of the base.

7. The filler tube according to claim 6, wherein the tank-side base portion is provided with a rib protruding in an annular shape outward radially.

8. The filler tube according to claim 1 further comprising:
a press-fit base portion disposed at an end of the filler tube in one of sides thereof opposite to the fuel tank, making a site into whose inside a mating member is press fitted, and serving as part of the base; and
a non-press-fit base portion disposed consecutively to the press-fit base portion, and serving as another part of the base.

9. The filler tube according to claim 8, wherein the non-press-fit base portion is provided with a bent section whose central axis line is curved.

10. A manufacturing process for the filler tube according to claim 1, the manufacturing process comprising:
a primary molding step of using a corrugated mold to mold a primary molded body by corrugation molding; and
a secondary molding step of using an outer peripheral mold and an inner peripheral mold to mold the filler tube by performing press processing to the primary molded body;
the primary molded body including the base, the bellows, a cylindrical to-be-molded portion serving as a site for the flange before being flare molded, and the heavy-thickness cylinder;
the secondary molding step including:
a primary-molded-body arrangement step of arranging the primary molded body onto the outer peripheral mold so as to make the outer peripheral mold, which is set at a predetermined temperature, support an outer peripheral face in the heavy-thickness cylinder of the primary molded body; and
a flare-molding step of flare molding the flange by inserting the inner peripheral mold, which is set at a higher temperature than the predetermined temperature of the outer peripheral mold, into an inner peripheral side of the to-be-molded portion after the primary-molded-body arrangement step, and then relatively moving the outer peripheral mold and the inner peripheral mold in an axial direction thereof to make an end face of the outer peripheral mold and the inner peripheral mold clamp the to-be-molded portion therebetween in the axial direction.

* * * * *